United States Patent
Jonsson et al.

(10) Patent No.: US 10,030,687 B2
(45) Date of Patent: Jul. 24, 2018

(54) BOLT, AND ROCK DRILL WITH BOLT

(71) Applicant: Atlas Copco Rock Drills AB, Orebro (SE)

(72) Inventors: Per Jonsson, Orebro (SE); Fredrik Saf, Vintrosa (SE)

(73) Assignee: Epiroc Rock Drills Aktiebolag, Orebro (SE)

( * ) Notice: Subject to any disclaimer, the term of this patent is extended or adjusted under 35 U.S.C. 154(b) by 489 days.

(21) Appl. No.: 14/651,308

(22) PCT Filed: Jan. 27, 2014

(86) PCT No.: PCT/SE2014/050092
§ 371 (c)(1),
(2) Date: Jun. 11, 2015

(87) PCT Pub. No.: WO2014/116174
PCT Pub. Date: Jul. 31, 2014

(65) Prior Publication Data
US 2015/0330433 A1 Nov. 19, 2015

(30) Foreign Application Priority Data

Jan. 28, 2013 (SE) .................................. 1350089-7

(51) Int. Cl.
*F16B 35/00* (2006.01)
*E21B 1/00* (2006.01)
*B25F 5/02* (2006.01)

(52) U.S. Cl.
CPC .............. *F16B 35/005* (2013.01); *B25F 5/02* (2013.01); *E21B 1/00* (2013.01)

(58) Field of Classification Search
CPC ... E21B 7/025; E21B 6/00; E21B 1/00; E21B 21/00; B25D 2250/051; B25D 11/00;
(Continued)

(56) References Cited

U.S. PATENT DOCUMENTS 3,505,831 A * 4/1970 Beach ..................... F16C 1/06
464/173
4,548,279 A * 10/1985 Zaruba .................. B25D 17/30
173/112

(Continued)

FOREIGN PATENT DOCUMENTS

JP 2002-250374 9/2002
WO WO2011/002399 1/2011

OTHER PUBLICATIONS

Birmingham Fastener Manufacturing, Rolled Threads Vs. Cut Threads, Dec. 11, 2000.*
Fastenal Engineering, Heat Treatment, Mar. 4, 2009.*

*Primary Examiner* — Hemant M Desai
*Assistant Examiner* — Valentin Neacsu
(74) *Attorney, Agent, or Firm* — Mark P. Stone

(57) ABSTRACT

Herein a bolt (2) comprising an elongated body (4) with a central axis (C) is described. The elongated body (4) is in a first end (6) provided with a first thread (8) and in a second end (10) with a second thread (12). An intermediate part (14) of the elongated body (4) is provided with a collar (16). The collar (16) is provided with at least one first flat surface (18), which first flat surface (18) extends substantially in parallel with the central axis (C). Further, a rock drill comprising housing parts held together by at least one bolt (2) is described.

20 Claims, 2 Drawing Sheets

(58) Field of Classification Search
CPC ......... B25D 9/00; B25D 17/00; F16B 39/282; F16B 12/28; F16B 23/0069; F16B 23/0076; F16B 25/0036; F16B 39/00; F16B 35/00; F16B 37/042; F16B 35/005; F16B 35/04; B25F 5/02; B25F 5/006
USPC .......................... 173/171; 405/259; 411/361
See application file for complete search history.

(56) References Cited

U.S. PATENT DOCUMENTS

| | | | | |
|---|---|---|---|---|
| 4,681,496 A * | 7/1987 | Fasolino | ................ | F16B 19/05 411/361 |
| 4,863,329 A * | 9/1989 | Wilson | ...................... | F16B 5/02 248/635 |
| 5,170,551 A * | 12/1992 | Norberg | ................... | F16B 5/02 29/252 |
| 6,341,917 B1 * | 1/2002 | Schubring | ............ | F16B 5/0275 403/296 |
| 6,860,340 B2 * | 3/2005 | Rodert | ...................... | E21B 6/00 173/104 |
| 7,607,491 B2 * | 10/2009 | Sorric | ................... | B25D 17/30 173/169 |
| 7,677,852 B2 * | 3/2010 | Donovan | ................ | F16B 19/05 411/361 |
| 7,677,853 B2 * | 3/2010 | Donovan | ................ | F16B 19/05 411/361 |
| 7,694,749 B2 * | 4/2010 | Sorric | ...................... | B25D 9/04 173/169 |
| 7,896,103 B2 * | 3/2011 | Johnson | ................... | B25F 5/02 173/162.1 |
| 8,579,033 B1 * | 11/2013 | Robichaux | ............. | E21B 33/06 166/339 |
| 8,794,347 B2 * | 8/2014 | Rodert | ................ | B25D 17/005 173/1 |
| 8,894,329 B1 * | 11/2014 | Kekahuna | ............ | F16B 13/066 405/259.3 |
| 9,097,001 B2 * | 8/2015 | Espinosa | ................ | E04B 1/2604 |
| 9,169,864 B2 * | 10/2015 | Colombo | ............. | F16B 39/282 |
| 2002/0141846 A1 * | 10/2002 | McGough | ................ | F01L 1/46 411/378 |
| 2006/0087396 A1 * | 4/2006 | Bouchy | ................. | F01D 21/045 337/14 |
| 2007/0183865 A1 * | 8/2007 | Severns | ............... | F16B 5/0275 411/387.1 |
| 2009/0194306 A1 | 8/2009 | Johnson et al. | | |
| 2010/0059280 A1 | 3/2010 | Roberts | | |
| 2011/0030869 A1 * | 2/2011 | Marsaly | ................. | B60C 17/06 152/520 |
| 2011/0186322 A1 * | 8/2011 | Wasielewski | ............ | B25F 5/00 173/213 |
| 2012/0114426 A1 * | 5/2012 | Kenny | ................. | E21D 21/008 405/259.4 |
| 2012/0152620 A1 * | 6/2012 | Rodert | ................... | B25D 17/00 175/293 |
| 2013/0186667 A1 * | 7/2013 | Pettersson | ............. | B25D 9/145 173/208 |
| 2015/0197003 A1 * | 7/2015 | Lin | ........................... | B25F 5/02 173/218 |
| 2015/0330433 A1 * | 11/2015 | Jonsson | ................... | B25F 5/02 175/293 |
| 2017/0197604 A1 * | 7/2017 | Bachouchi | ............ | B60T 17/043 |
| 2017/0254168 A1 * | 9/2017 | Robichaux | .............. | E21B 33/06 |

* cited by examiner

BOLT, AND ROCK DRILL WITH BOLT

TECHNICAL FIELD

The present invention relates to a bolt and a rock drill with a housing comprising housing parts held together by a bolt.

BACKGROUND

In a certain type of rock drill, housing parts are held together by bolts with threads in both ends of the bolts and an eccentric collar, which enables a part of the housing to be demounted while the second housing parts are held held together. The eccentric collar constitutes a basis for an axial biasing force. The eccentric collar locks the bolt in rotational direction in a part of the housing together with a cylindrical surface of the bolt closest to the collar. Thereby may a nut be loosened at the same time as biasing of the other housing parts is maintained.

When the eccentric collar together with the cylindrical surface of the bolt locks the bolt in rotational direction large normal forces occurs in contact points; between the cylindrical surface of the bolt and the housing part, respective between the eccentric collar and the housing part. This cause wear damages on the cylindrical surface of the bolt when the rock drill vibrates during operation. These wear damages may initiate fatigue cracks causing fracture of the bolt.

SUMMARY OF THE INVENTION

An object of the present invention is to provide a bolt for holding together housing parts in a rock drill, which bolt has a good resistance to wear damages and fatigue fracture.

This object is achieved according to one aspect of the invention by a bolt comprising an elongated body with a central axis, which elongated body in a first end is provided with a first thread and in a second end is provided with a second thread. An intermediate part of the elongated body between the first end and the second end is provided with a collar. The collar is provided with at least a first flat surface, which first flat surface extends substantially in parallel with the central axis.

Since the collar is provided with at least a first flat surface, which first flat surface extends substantially in parallel with the central axis, the bolt may be fixed against rotation in that the first flat surface abuts for example a part of the housing of a rock drilling machine. The elongated body of the bolt need not abut any part of the housing to achieve rotational fixation of the bolt in the housing part. The normal forces occurring on the cylindrical surface of the elongated body of a bolt with eccentric collar according to prior art may thereby be avoided. Thus, the above mentioned purpose is achieved.

The bolt may be designed such that the elongated body is of a different diameter along with the bolt. The bolt may be designed such that the collar is the part of the bolt with the largest diameter. The collar may extend radially perpendicular outwards from the central axis. The intermediate part of the bolt being provided with the collar need not be centrally arranged along the central axis of bolt but may for example be arranged closer to the second end of the bolt than to the first end of the bolt. Thus, the placement of the collar on the bolt may be depending on the number of and the size of the housing parts of a rock drill to be held together by the bolt.

According to embodiments may the first flat surface be arranged to abutment a surface for rotational fixation of the bolt. Thereby may a more advantageous abut between a part of the bolt and for example a part of the housing of a rock drill be achieved than at known bolts with eccentric collar, thus, unfavorable normal forces may result in wear in contact points between the cylindrical surface of the bolt and the housing part, respective between the eccentric collar and the housing part may be avoided.

According to embodiments, the first thread has a first diameter, and the collar extends a first distance along with the central axis. The first distance may have a length within the interval of 0.5-3 multiplied with first the diameter. Thereby the collar, and thereby also the first flat surface, may have an extension large enough to obtain a surface large enough to distribute forces that may occur at rotational fixation of the bolt. Further, thereby may a collar of a size large enough to capture shearing forces along with the central axis be achieved, forces occurring when holding together housing parts of a rock drilling machine.

According to embodiments, the second thread may have a second diameter, and the second diameter may be within the interval of 0.8-1.2 multiplied with the first the diameter.

According to embodiments, the collar has a first cylindrical surface part and a second cylindrical surface part. The first and second cylindrical surface parts may be substantially in parallel with the central axis. A distance between the first and the second cylindrical part surface parts constitutes a third diameter. The third diameter may be within the interval of 1.5-3 multiplied with the first diameter. Thereby, a collar with a cross section of a size for absorbing of forces along the central axis of the bolt may be achieved. The first cylindrical surface part and the second cylindrical surface part may be arranged in direct connection to each other, or may be separated from each other by the first flat surface and another at least one flat surface.

According to embodiments, the collar may be provided with a second flat surface, which second flat surface may be in parallel with the first flat surface. Thereby, two surfaces for distributing the forces that may occur at rotational fixation of the bolt may be achieved.

According to embodiments, a distance between the first flat surface and the second flat surface may be within the interval of 1.2-2.5 multiplied with the first the diameter. Thereby, a collar with a cross section of a size enough to absorb forces along the central axis of the bolt may be achieved. Further, a collar of a size large enough to be able to absorb shear forces along with the central axis is achieved.

According to embodiments, the collar may be designed in a homogenous piece together with the elongated body. Thereby, the collar may constitute a fixed resistance to forces along with the central axis.

According to embodiments, a transition from the elongated body to the collar may have a radius, which radius is 1.5-5 mm. Thereby, the risk for cracking at the transition between the elongated body and the collar is minimized.

According to embodiments, the elongated body may comprise a first cylindrical support surface adjacent to the first thread, and a second cylindrical support surface adjacent to the second thread. Thereby may for example housing parts of a rock drill be positioned in relation to the first and to the second thread by abutting the first and the second support surface.

According to embodiments, the elongated body may, along the central axis from the first end, consecutively be provided with the first thread, the first cylindrical support surface and a first elongated part, which first elongated part may have a diameter less than the first cylindrical support surface. The elongated body may, along the central axis from the second end, consecutively be provided with the second thread, the second cylindrical support surface and a second elongated part, which second elongated part may have a diameter less than the second cylindrical support surface. Thanks to the lesser diameter in respective first and second elongated parts, vibrations along the central axis of the bolt will be of a lesser tension amplitude than the in a bolt with first and second elongated parts of the same thickness diameter as the first and second cylindrical support surfaces. The time period before a fatigue fracture increases with decreasing tension amplitude, and thereby the lifetime of the bolt increases.

According to embodiments, the first thread and the second thread may be rolled threads. Rolled threads are made by threads milled in in the bolt, in contrast to cut threads. In this way a bolt with strong threads is achieved.

According to embodiments, the bolt may be made of quenched and tempered steel. Thereby may a bolt of strength suitable for, as for example, holding together housing parts of a rock drill be achieved.

Another object of the present invention is to provide a rock drill, in which housing parts of a machine housing of the rock drill are held together in a reliable way.

This object is, according to one aspect of the invention, achieved by a rock drill comprising a machine housing for housing and slideable mounting of an impact piston and a neck adapter. The machine housing comprises a first housing part, a second housing part and a third housing part. The first housing part is arranged on a first side of the second housing part, and the third housing part is arranged on a second side of the second housing part. The first housing part, the second housing part and the third housing part are hold together by at least the bolt according to any of the aspects or the embodiments described herein. The second housing part is provided with a seat, in which seat the collar of the bolt is arranged rotationally fixed by at least partial abutment between the first flat surface of the collar and a first flat seat surface of the seat, which first flat seat surface extends substantially in parallel with the central axis of the bolt.

Since the bolt according to aspects and embodiments described herein uses, and the second housing part is provided with, a seat in which the first flat surface of the collar abuts the first flat seat surface, the bolt is rotationally fixed in a way achieving good resistance to wear damages and fatigue fracture of the bolt when the housing parts of the rock drill are held together. Thus, the above mentioned purpose is achieved.

According to embodiments, the bolt extends through the second housing part, and the seat is arranged in connection with the second side of the second housing part. The collar may at least partly abut the second housing part in the seat in a first level, which first level extends substantially perpendicular to the central axis of the bolt. Thereby, housing parts of the machine housing of the rock drill may be biased together by the bolt in that the seat in the second housing part constitutes a resistance to the collar.

According to embodiments, the elongated body may extend, in direction from the first flat surface towards the first end of the bolt, radially without contact through the second housing part. Thereby, no normal forces occurs between the elongated body of the bolt and the second housing part when the bolt is rotationally fixed in the second housing part by abutment between the first flat the surface of the collar and the first flat seat surface. Thereby, wear damages on the cylindrical surface of the bolt may be avoided when the rock drill vibrates during operation. Thus, only at the periphery of the collar the rotational fixation is achieved, and it is therefore mainly the periphery of the collar that is in contact with the second housing part. Since the collar has larger diameter than the elongated body, any wear damages on this part of the bolt do not have any significance for the strength of the bolt related to holding together the housing parts.

According to embodiments, the first housing part may be biased, by the bolt, between a first nut arranged on the first thread and the second housing part, in which second part of the housing the collar in the seat constitutes a resistance to the first bolt in a direction along the central axis. The third housing part may be biased, by the bolt, between the second housing part and a second nut arranged on the second thread, to which second nut the first bolt constitutes a resistance in the direction along the central axis.

According to embodiments, the first cylindrical support surface may at least partly radially abut the first housing part and the second cylindrical support surface may at least partly radially abut the third housing part.

Other features and advantages for the present invention appear from the attached claims and the following detailed the description. The skilled person within the field realizes that different features of the invention may be combined to create other embodiments than the described below, without deviating from the scope of protection of the present invention as defined by the attached claims.

DESCRIPTION OF DRAWINGS

Different approaches to the invention, including special features and advantages, appear from the following detailed description and the associated drawings, in which.

DETAILED DESCRIPTION

Figure 1:
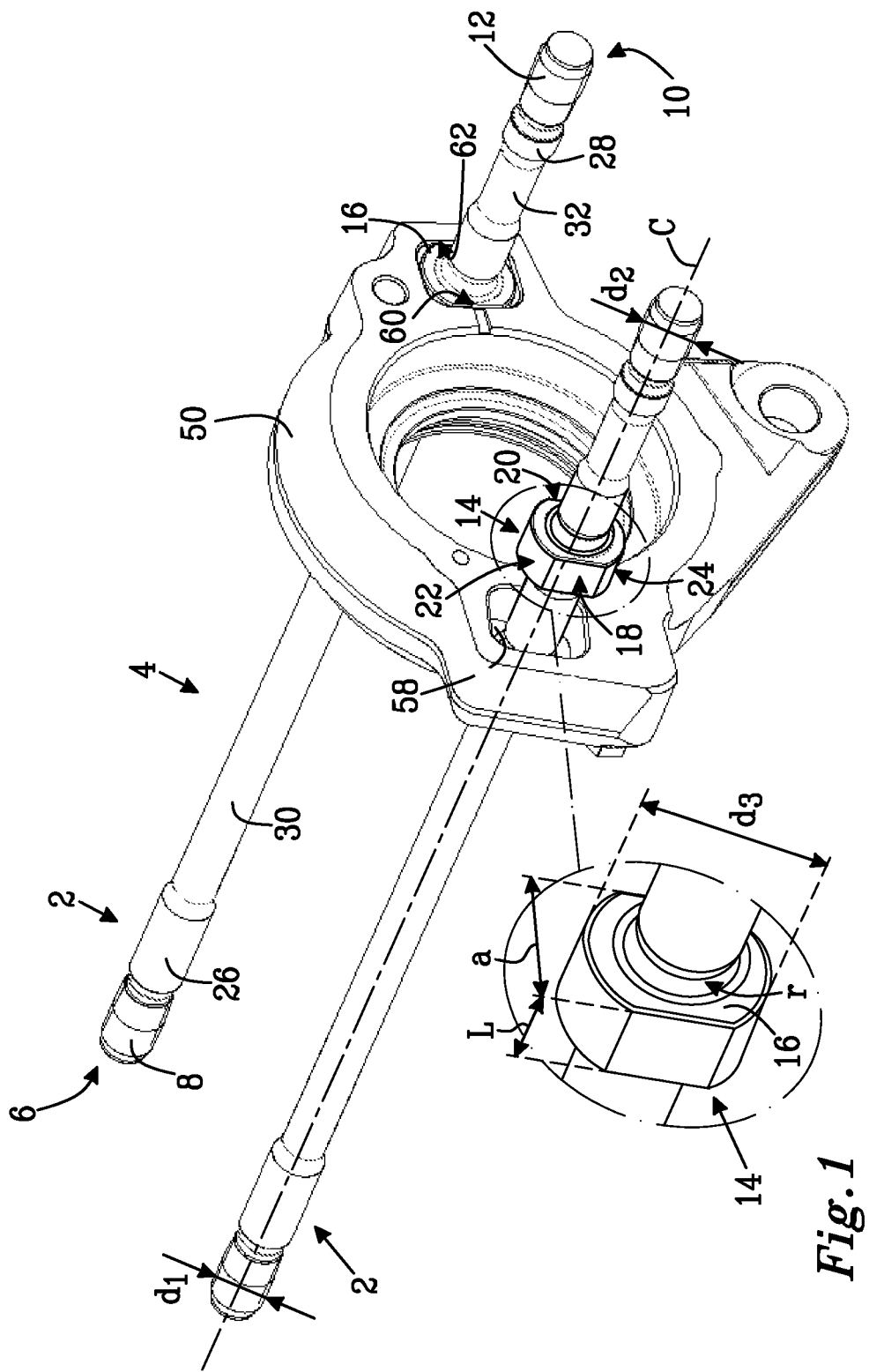
FIG. 1 shows two bolts according to embodiments of the present invention.

The present invention is described more in detail below with reference to the attached drawings, in which example of embodiments is shown. The invention shall not be interpreted to be limited to the described examples of embodiments. Like numbers in the drawings relate throughout to like elements. For simplicity well-known functions and designs may not necessarily be described in detail.

FIG. 1 shows a first and a second bolt 2 according to embodiments of the present invention. The two bolts 2 are of same type. For clarity reasons some of the references in FIG. 1 refer to the first bolt 2 and some to the second bolt 2. In the description below will reference be made solely to the bolt 2.

The bolt 2 comprises an elongated body 4 with a central axis C. The bolt 2 is made of quenched and tempered steel. The elongated body 4 is in a first end 6 provided with a first thread 8 and in a second end 10 provided with a second thread 12. The first thread 8 and the second thread 12 are rolled helical threads. Between the first end 6 and the second end 10 is an intermediate part 14 of the elongated body 4 arranged. The intermediate part 14 is provided with a collar 16.

The collar 16 is provided with a first flat surface 18 and a second flat surface 20. The first flat surface 18 extends substantially in parallel with the central axis C. The second flat surface 20 is in parallel with the first flat surface 18. The collar 16 is designed in a homogenous piece together with the elongated body 4. A transition from the elongated body to the collar has a radius r, which radius r is 1.5-5 mm.

The first thread 8 has a first diameter di. The second thread 12 has a second diameter $d_2$. The second diameter $d_2$ may be within the interval of 0.8-1.2 multiplied with the first the diameter di. In the present embodiments is the second diameter $d_2$ is the same as the first diameter di. The collar 16 extends a first distance L along with the central axis C. The first distance L may be of a length within the interval of 0.5-3 multiplied with the first diameter di. In the present embodiments is the first distance L about the same as the first diameter di.

The collar 16 has a first cylindrical surface part 22 and a second cylindrical surface part 24. The first and the second cylindrical surface parts 22, 24 are substantially in parallel with the central axis C. A distance between the first and the second cylindrical surface parts 22, 24 constitutes a third diameter $d_3$. The third diameter $d_3$ may be within the interval of 1.5-3 multiplied with the first diameter di. In the present embodiments are the third diameter $d_3$ is about 1.8 multiplied with the first diameter di. A distance between the first flat surface 18 and the second flat surface 20 may be within the interval of 1.2-2.5 multiplied with first the diameter di. In the present embodiments the distance is about 1.5 multiplied with the first the diameter di.

The elongated body 4 comprises a first cylindrical support surface 26 adjacent to the first thread 8, and a second cylindrical support surface 28 adjacent to the second thread 12. The central axis for the first and the second cylindrical support surface 22, 24 coincides with the central axis C for the elongated body 4. Along the central axis C is the elongated body 4 from the first end 6 consecutively provided with the first thread 8, the first cylindrical support surface 26 and a first elongated part 30. The first elongated part 30 has a diameter less than the first cylindrical support surface 26. Along the central axis C from the second end 10 is the elongated body 4 consecutively provided with the second thread 12, the second cylindrical support surface 28 and a second elongated part 32. The second elongated part 32 has a diameter less than the second cylindrical support surface 28.

Figure 2:
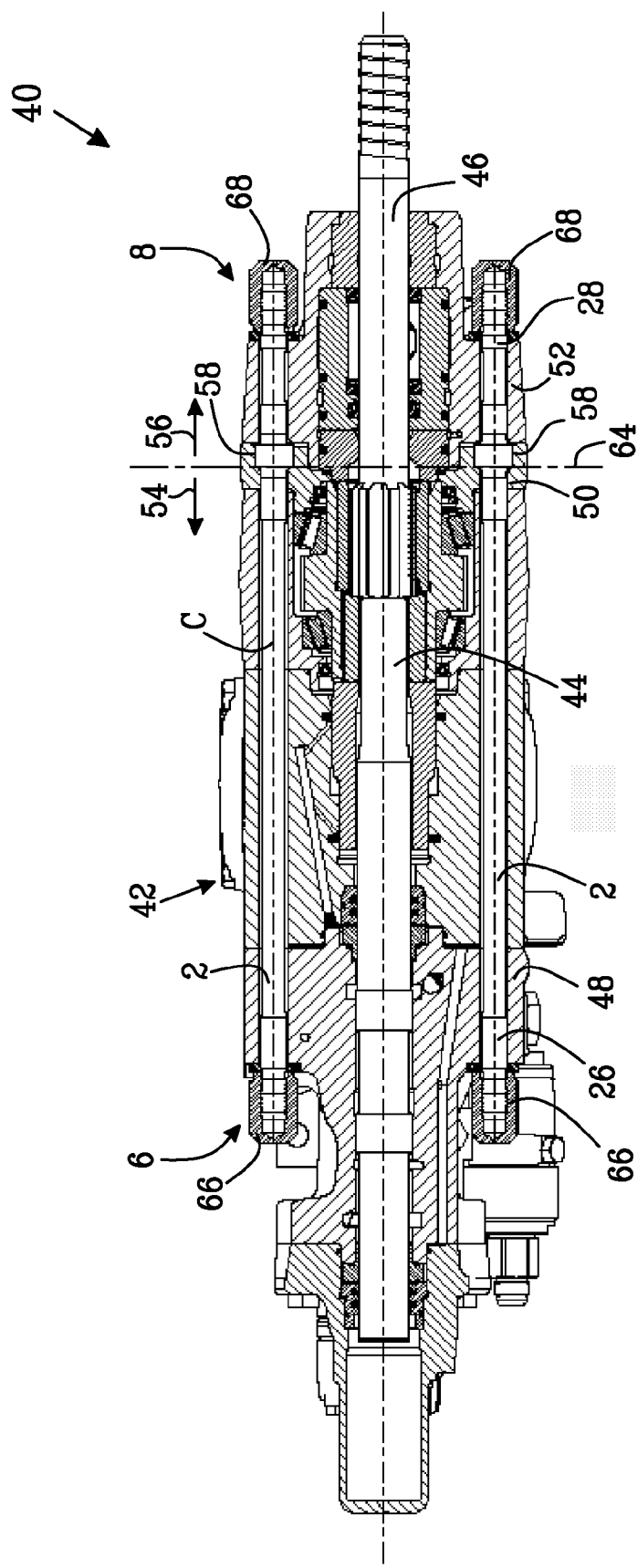
FIG. 2 shows a cross section view of a rock drill according to embodiments of the invention.

FIG. 2 shows a view of a rock drill 40 according to embodiments of the invention. The rock drill 40 comprises a machine housing 42 for housing and slideable mounting of e.g. an impact piston 44 and a neck adapter 46. The machine housing 42 comprises e.g. a first part of the housing 48, a second part of the housing 50 and a third part of the housing 52. The first housing part 48 is arranged on a first side 54 of the second housing part 50 and the third housing part 52 is arranged on a second side 56 of the second housing part 50.

The first housing part 48, the second housing part 50 and the third housing part 52 are held together by two bolts 2 according to any of the aspects or the embodiments described herein. In this embodiment are another two housing parts held together by the two bolts 2. The other two housing parts are arranged between the first housing part 48 and the second housing part 50. The second housing part 50 is provided with a seat 58, see also FIG. 1. In the seat 58 is the collar 16 of each bolt 2 arranged rotationally fixed by at least partial abutment between the first flat surface 18 of the collar 16 and a first flat seat surface 60 of the seat 58. The first flat seat surface 60 of the seat 58 extends substantially in parallel with the central axis C of the bolt 2. The first flat surface 18 is thus arranged to abut a surface of the seat 58 for rotational fixation of the bolt 2. Also the second flat surface 20 of the collar 16 at least partly abuts a flat surface of the seat 58, namely a second flat seat surface 62, and thereby contributes to the rotational fixation of the bolt 2.

The continued description refers both to FIGS. 1 and 2. Each bolt 2 extends through the second housing part 50. The second housing part 50 is thus provided with two through holes for this purpose. Each seat 58 consists in part of respective through hole. The seat 58 is arranged in connection with the second side 56 of the second housing part 50. The collar 16 at least partly abuts the second housing part 50 in the seat 58 at a first level 64. The first level 64 extends substantially perpendicular to the central axis C of the bolt 2.

The seat 58 constitutes a resistance to the collar 16 when the first housing part 48 and the further two housing parts biased together by the bolt 2 towards the second housing part 50, from/towards the first side 54 of the second housing part 50. Thus, the first housing part 48 is biased, by the two bolts 2, between a first nut 66 arranged on the first thread 8, and the second housing part 50. In the second housing part 50 the collar 16 constitutes, in the seat 58, a resistance to the first bolt 66 in a direction along the central axis C. In a corresponding way is the third housing part 52, from/towards the second side 56 of the second housing part 50, by the bolt 2 biased between the second housing part 50 and a second nut 68 arranged on the second thread 12. For the second nut 68, the first bolt 66 constitutes a resistance in the direction along the central axis C. The third housing part 52 may thus be loosened from the second housing part 50 by that the second bolt 68 is loosened, without need to loosen the housing part 48 from the second housing part 50.

The elongated body 4 extends, in direction from the first level 64 to the first end 6 of the bolt 2, radially without contact through the second housing part 50. The rotational fixation of the bolt 2 in the second housing part 50 is thus achieved by contact between the periphery of the collar 16 and the second housing part 50. The first cylindrical support surface 26 at least partly radially abuts the first housing part 48 and the second cylindrical support surface 28 at least partly radially abuts the third housing part 52. The first and the second support surfaces 26, 38 may thus constitute guiding elements of the first and the third housing parts 48, 52, respectively.

The skilled person within the field realizes that the embodiments described above may be combined. Different modifications are obvious for the skilled person. For example, the collar 16 may be provided with solely one first flat surface 16. The collar 16 may alternatively be provided with more than two flat surfaces, for example four, six or eight flat surfaces. Each of the two bolts 2, suitable for holding together housing parts of a drilling machine 40 according to embodiments, may have the following size, which size only is quoted in exemplifying purpose: $d_1$=20 mm, $d_2$=20 mm, $d_3$=36 mm, L=18 mm, a=30 mm.

Thus, the invention is not limited to the described embodiments. The invention is solely limited by the scope of protection defined by the patent claims.

The invention claimed is:

1. A bolt (2) for holding together housing parts in a rock drill, the bolt comprising an elongated body (4) with a central axis (C), which elongated body (4) in a first end (6) is provided with a first helical thread (8) and in a second end (10) is provided with a second helical thread (12), wherein an intermediate part (14) between the first end (6) and the second end (10) of the elongated body (4) is provided with a collar (16), wherein the collar (16) is provided with at least one first flat surface (18), which first flat surface (18) extends in parallel relationship with the central axis (C), and wherein the elongated body (4) along the central axis (C) from the first end (6) consecutively is provided with the first thread (8), a first cylindrical support surface (26) and a first elongated part (30), which first elongated part (30) has a diameter less than the first cylindrical support surface (26), and wherein the elongated body (4) along the central axis (C) from the second end (10) consecutively is provided with the second thread (12), a second cylindrical support surface (28) and a second elongated part (32), which second elongated part (32) has a diameter less than the second cylindrical support surface (28).

2. The bolt (2) according to claim 1, wherein the first flat surface (18) is arranged to abut against a flat seat surface (60) of a housing part (50) for rotational fixation of the bolt (2).

3. The bolt (2) according to claim 2, wherein the first thread (8) has a first diameter ($d_1$), and wherein the collar (16) extends a first distance (L) along with the central axis (C), which first distance (L) is of a length within the interval of 0.5-3 multiplied with the first diameter ($d_1$).

4. The bolt (2) according to claim 1, wherein the first thread (8) has a first diameter ($d_1$), and wherein the collar (16) extends a first distance (L) along with the central axis (C), which first distance (L) is of a length within the interval of 0.5-3 multiplied with the first diameter ($d_1$).

5. The bolt (2) according to claim 4, wherein the second thread (12) has a second diameter ($d_2$), and wherein the second diameter ($d_2$) is within the interval of 0.8-1.2 multiplied with the first diameter ($d_1$).

6. The bolt (2) according to claim 5, wherein the collar (16) has a first cylindrical surface part (22) and a second cylindrical surface part (24), which first and second cylindrical surface parts (22, 24) are in parallel relationship with the central axis (C), and wherein a distance between the first and the second cylindrical surface part (22, 24) constitutes a third diameter ($d_3$), which third diameter ($d_3$) is within the interval of 1.5-3 multiplied with the first diameter ($d_1$).

7. The bolt (2) according to claim 4, wherein the collar (16) has a first cylindrical surface part (22) and a second cylindrical surface part (24), wherein said first and second cylindrical surface parts (22, 24) are arranged to be in parallel relationship with the central axis (C), and wherein a distance between the first and the second cylindrical surface part (22, 24) constitutes a third diameter ($d_3$), which third diameter ($d_3$) is within the interval of 1.5-3 multiplied with the first diameter ($d_1$).

8. The bolt (2) according to claim 1, wherein the collar (16) is provided with a second flat surface (20), said second flat surface (20) being in parallel relationship with the first flat surface (18).

9. The bolt (2) according to claim 8, wherein the first thread (8) has a first diameter ($d_1$), and a distance (a) between the first flat surface (18) and the second flat surface (20) is within the interval of 1.2-2.5 multiplied with the first diameter ($d_1$).

10. The bolt (2) according to claim 1, wherein the collar (16) is designed in a homogenous piece together with the elongated body (4).

11. The bolt (2) according to claim 10, wherein a transition from the elongated body (4) to the collar (16) has a radius (r), which radius (r) is 1.5-5 mm.

12. The bolt (2) according to claim 1, wherein the elongated body (4) comprises the first cylindrical support surface (26) adjacent to the first thread (8) and the second cylindrical support surface (28) adjacent to the second thread (12).

13. The bolt (2) according to claim 1, wherein the first thread (8) and the second thread (12) are rolled threads.

14. The bolt (2) according to claim 1, wherein the bolt (2) is made of quenched and tempered steel.

15. A rock drill (40) comprising a machine housing (42) for housing and bear mounting of an impact piston (44) and a neck adapter (46), which machine housing (42) comprises a first housing part (48), a second housing part (50) and a third housing part (52),
wherein the first housing part (48) is arranged on a first side (54) of the second housing part (50) and the third housing part (52) is arranged on a second side (56) of the second housing part (50),
wherein the first housing part (48), the second housing part (50) and the third housing part (52) are held together by at least one bolt (2) comprising an elongated body (4) with a central axis (C), which elongated body (4) in a first end (6) is provided with a first helical thread (8) and in a second end (10) is provided with a second helical thread (12), wherein an intermediate part (14) between the first end (6) and the second end (10) of the elongated body (4) is provided with a collar (16),
wherein the collar (16) is provided with at least one first flat surface (18), which first flat surface (18) extends in parallel relationship with the central axis (C), and wherein the elongated body (4) along the central axis (C) from the first end (6) consecutively is provided with the first thread (8), a first cylindrical support surface (26) and a first elongated part (30), which first elongated part (30) has a diameter less than the first cylindrical support surface (26), and wherein the elongated body (4) along the central axis (C) from the second end (10) consecutively is provided with the second thread (12), a second cylindrical support surface (28) and a second elongated part (32), which second elongated part (32) has a diameter less than the second cylindrical support surface (28), and wherein the second housing part (50) is provided with a seat (58), in which seat (58) the collar (16) of the bolt (2) is rotationally fixed arranged by at least partial abutment between the first flat surface (18) of the collar (16) and a first flat seat surface (60) of the seat (58), which first flat seat surface (60) extends in parallel relationship with the central axis of the bolt (2).

16. The rock drill (40) according to claim 15, wherein the bolt (2) extends through the second housing part (50), and the seat (58) is arranged in connection with the second side (56) of the second housing part (50), and wherein the collar (16) at least partly abuts the second housing part (50) in the seat (58) in a first level (64), which first level (64) extends in perpendicular relationship with the central axis (C) of the bolt (2).

17. The rock drill (40) according to claim 16, wherein the elongated body (4) extends, in a direction from the first level (64) towards the first end (6) of the bolt (2), radially contact free through the second housing part (50).

18. The rock drill (40) according to claim 17, wherein the first housing part (48) is biased, by the bolt (2), between a first nut (66) arranged on the first thread (8) and the second housing part (50), in which second housing part (50) the collar (16) in the seat (58) constitutes a resistance to the first nut (66) in a direction along the central axis (C), and wherein the third housing part (52) is biased, by the bolt (2), between the second housing part (50) and a second nut (68) arranged on the second thread (12), to which second nut (68) the first nut (66) constitutes a resistance in the direction along the central axis (C).

19. The rock drill (40) according to claim 16, wherein the first housing part (48) is biased, by the bolt (2), between a first nut (66) arranged on the first thread (8) and the second housing part (50), in which second housing part (50) the collar (16) in the seat (58) constitutes a resistance to the first nut (66) in a direction along the central axis (C), and wherein the third housing part (52) is biased, by the bolt (2), between the second housing part (50) and a second nut (68) arranged on the second thread (12), to which second nut (68) the first nut (66) constitutes a resistance in the direction along the central axis (C).

20. The rock drill (40) according to claim 15, wherein the first cylindrical support surface (26) at least partly radially abut the first housing part (48) and the second cylindrical support surface (28) at least partly radially abuts the third housing part (52).

* * * * *